United States Patent
Chen et al.

(10) Patent No.: US 9,022,333 B2
(45) Date of Patent: May 5, 2015

(54) CLIPPING JOINTER STRUCTURE

(71) Applicant: Lite-On Technology Corporation, Taipei (TW)

(72) Inventors: Hsing-Yu Chen, Taoyuan Hsien (TW); Ching-Hsien Lin, Taoyuan Hsien (TW); Chao-Hsien Wu, Taoyuan Hsien (TW)

(73) Assignee: Lite-On Technology Corporation (TW)

( * ) Notice: Subject to any disclaimer, the term of this patent is extended or adjusted under 35 U.S.C. 154(b) by 0 days.

(21) Appl. No.: 14/142,503

(22) Filed: Dec. 27, 2013

(65) Prior Publication Data

US 2014/0182090 A1    Jul. 3, 2014

(30) Foreign Application Priority Data

Dec. 27, 2012  (TW) .............................. 101150621 A

(51) Int. Cl.
*A47B 96/06* (2006.01)
*F16B 5/06* (2006.01)

(52) U.S. Cl.
CPC .................................... *F16B 5/0621* (2013.01)

(58) Field of Classification Search
USPC ........... 248/227.3, 227.4, 228.1, 231.51, 339, 248/340, 341, 342, 343, 228.6, 229.13, 248/229.14; 16/87.8, 96 R
See application file for complete search history.

(56) References Cited

U.S. PATENT DOCUMENTS

| | | | | |
|---|---|---|---|---|
| 3,589,660 A | * | 6/1971 | Dunckel | 248/343 |
| 4,908,915 A | * | 3/1990 | Ruggles et al. | 24/336 |
| 5,335,890 A | * | 8/1994 | Pryor et al. | 248/343 |
| 5,653,412 A | * | 8/1997 | Martorano et al. | 248/222.11 |
| 6,409,415 B1 | | 6/2002 | Toder | |

* cited by examiner

*Primary Examiner* — Gwendolyn Baxter
(74) *Attorney, Agent, or Firm* — Innovation Counsel LLP

(57) ABSTRACT

A clipping jointer structure including a hooking member, a first moving fastener and a second moving fastener is provided. The hooking member is assembled to a rigid body, and has a suspending portion to buckle the hooking member onto one side of the rigid body. The first moving fastener is disposed on a board of the hooking member, and has an operating portion to buckle the first moving fastener onto another side of the rigid body or separate the first moving fastener from the rigid body. The second moving fastener is disposed on the board of the hooking member, and has a supporting portion to buckle the second moving fastener onto the structure body.

12 Claims, 4 Drawing Sheets

CLIPPING JOINTER STRUCTURE

This application claims the benefit of Taiwan application Serial No. 101150621, filed Dec. 27, 2012, the subject matter of which is incorporated herein by reference.

BACKGROUND OF THE INVENTION

1. Field of the Invention

The invention relates in general to a clipping jointer structure, and more particularly to a screw-free clipping jointer structure.

2. Description of the Related Art

Ordinary lighting appliances, such as fluorescent lamps, art lights, advertising lights, and projection lamps, have a diversity of varieties and models. Most lighting appliances once installed are fixed, and their illumination angle and scope are fixed accordingly and can hardly be adjusted to match the installation environment. In addition, the lighting appliance or the lighting decoration are often fixed or suspended on the steel frame of the ceiling by using screws. However, the practice of screw fixing requires drilling and the positions and quantity of screws must match the drilling positions, and make the assembly inconvenient. When it comes to the dismounting, the screws must be unscrewed off the lighting appliance one by one.

Since it is difficult to assemble the lighting appliance or the lighting decoration at a high position, the design of fastener must consider the factors such as assembly convenience and safety. Therefore, how to provide a fastener dispensing with screw without affecting structural intensity and safety has become a prominent task for the industries.

SUMMARY OF THE INVENTION

The invention is directed to a clipping jointer structure providing assembly convenience and variability.

According to one embodiment of the present invention, a clipping jointer structure used for suspending a structure body on a rigid body is provided. The clipping jointer structure includes a hooking member, a first moving fastener and a second moving fastener. The hooking member is assembled to the rigid body, and the hooking member has a suspending portion to buckle the hooking member onto one side of the rigid body. The first moving fastener is disposed on a board of the hooking member, and has an operating portion to buckle the first moving fastener onto another side of the rigid body or separate the first moving fastener from the rigid body. The operating portion and the suspending portion are opposite in parallel. The operating portion and the suspending portion are separated from the board by a gap. The second moving fastener is disposed on the board of the hooking member, and has a supporting portion to buckle the second moving fastener onto a structure body.

According to another embodiment of the present invention, a clipping jointer structure used for suspending a structure body on a rigid body is provided. The clipping jointer structure includes a hooking member, a first fastener and a second fastener. The hooking member has a board and a suspending portion. The first fastener has an operating portion rotatably disposed on the board of the hooking member. The clipping jointer structure is buckled onto the rigid body by buckling the suspending portion of the hooking member and the operating portion of the first fastener with the rigid body. The second fastener is disposed on the board of the hooking member and has a supporting portion for buckling the structure body. The operating portion of the first fastener is rotated to have a first position to buckle the rigid body and a second position to release the rigid body.

The above and other aspects of the invention will become better understood with regard to the following detailed description of the preferred but non-limiting embodiments. The following description is made with reference to the accompanying drawings.

DETAILED DESCRIPTION OF THE INVENTION

A clipping jointer structure is disclosed in the present description. According to an embodiment of the clipping jointer structure, the conventional screw locking structure is replaced with a hooking member and a fastener used for suspension purpose, and a structure body is supported by using another fastener such that the structure body can be suspended on a rigid body through the clipping jointer structure. For instance, the rigid body can be a bracket such as a light steel frame or so call the T-bar disposed on the ceiling, and the structure body can be a lamp such as a lighting appliance or a lighting decoration member, or a frame used for other purposes. For instance, the clipping jointer structure of the present embodiment can buckle the lighting appliance onto the light steel frame disposed on the ceiling. Moreover, the angle of the lighting appliance can be rotated or the illumination position can be adjusted to match the installation environment. The lighting appliance can be installed on the light steel frame without drilling any holes on the frame, and it is very convenient for the user to adjust the angle or the position of the lighting appliance. Therefore, the clipping jointer structure of the present embodiment provides both assembly convenience and variability.

A number of embodiments are disclosed below for elaborating the invention. However, the embodiments of the invention are for detailed descriptions only, not for limiting the scope of protection of the invention.

Figure 1:
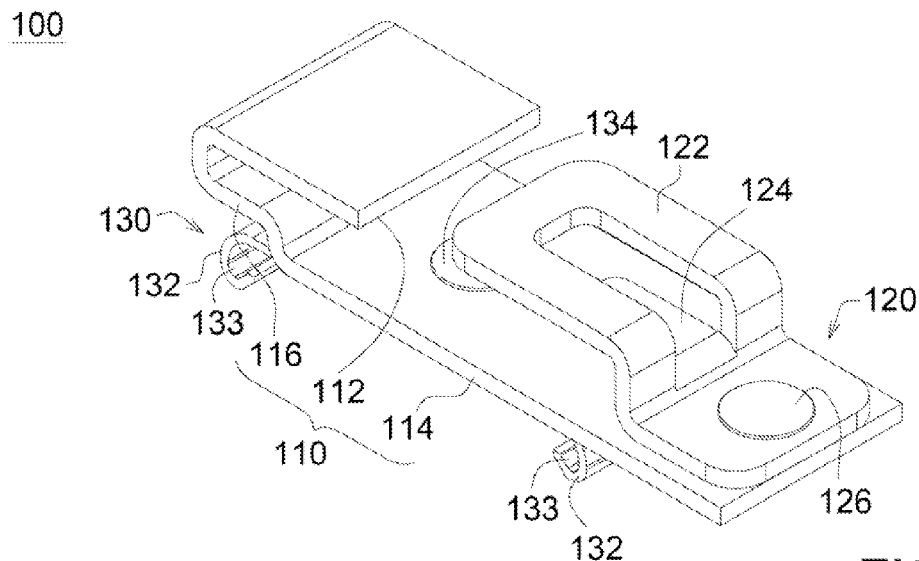
FIGS. 1 and 2 respectively are a schematic diagram and an assembly diagram of a clipping jointer structure according to an embodiment of the invention.
Figure 2:
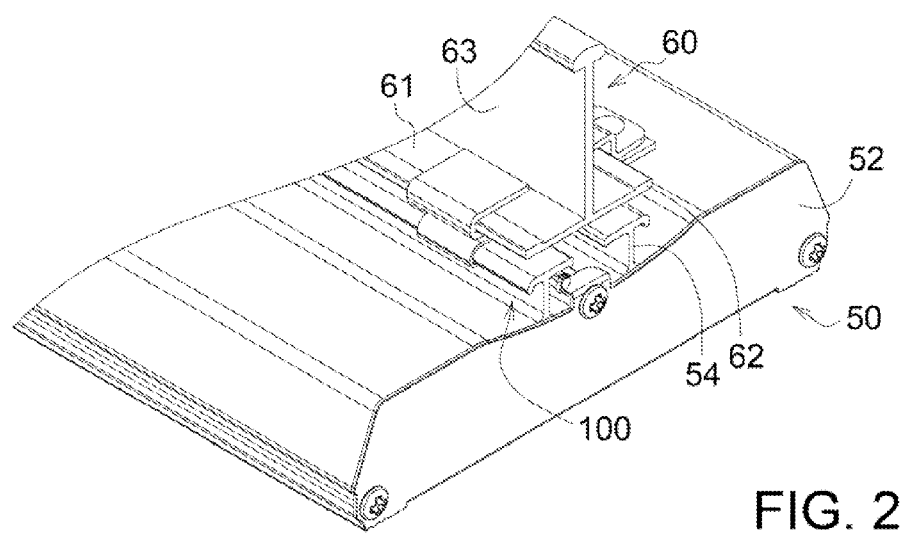

FIGS. 1 and 2 respectively are a schematic diagram and an assembly diagram of a clipping jointer structure 100 according to an embodiment of the invention. As indicated in FIG. 2, the clipping jointer structure 100 supports and suspends a structure body 50 on a rigid body 60. The structure body 50 may include a lighting body 52 and a bracket 54. The bracket 54 is located at the rear of the lighting body 52, and can be an H-shaped or a rectangular bracket. Besides, the rigid body 60, which can be a T-shaped light steel frame, includes two wing portions 61 and 62 and a rib 63. According to the clipping jointer structure 100 of the present embodiment, the structure body 50 can be suspended on two wing portions 61 and 62 of the rigid body 60 without employing any screws, hence increasing assembly convenience. Although the present embodiment is exemplified by the lighting body 52, the application of the invention is not limited thereto.

As indicated in FIG. 1, the clipping jointer structure 100 includes a hooking member 110, a first moving fastener 120 and a second moving fastener 130. The hooking member 110 is assembled to the rigid body 60 as shown in FIG. 2, and has a suspending portion 112 to buckle the hooking member 110 onto one side (such as the left-hand side) of the rigid body 60. The first moving fastener 120 is disposed on a board 114 of the hooking member 110, and has an operating portion 122 to buckle the first moving fastener 120 onto another side (such as the right-hand side) of the rigid body 60 or separate the first moving fastener 120 from the rigid body 60. The operating portion 122 and the suspending portion 112 are opposite in parallel, and the operating portion 122 and the suspending portion 112 are separated from the board 114 by a gap. The second moving fastener 130 is disposed on the board 114 of the hooking member 110, and has a supporting portion 132 to buckle the second moving fastener 130 onto the structure body 50 of FIG. 2.

The hooking member 110 of the present embodiment can be a hook integrally formed in one piece. The hooking member 110 includes a suspending portion 112, a board 114 and a bending portion 116 connected between the suspending portion 112 and the board 114. In addition, the first moving fastener 120 of the present embodiment can form an extending portion 124 by way of stamping. The extending portion 124 is extended on the board 114 in a direction parallel to the operating portion 122. The supporting portion 132 of the present embodiment is bent inwardly from two opposite sides of the second moving fastener 130 to form two C-shaped recesses 133.

The first moving fastener 120 may further include a first coupling member 126 which can be fixed onto the board 114 for enabling the first moving fastener 120 to rotate with respect to the board 114. The first coupling member 126 can be a rivet or a mechanism with riveting feature. The second moving fastener 130 may further include a second coupling member 134 which can be fixed onto the board 114 for enabling the second moving fastener 130 to rotate with respect to the board 114. The second coupling member 134 can be a rivet or a mechanism with riveting feature.

Based on the above disclosure, the first moving fastener 120 and the second moving fastener 130 are respectively disposed on two opposite sides of the board 114 for buckling the rigid body 60 and the structure body 50 respectively to increase assembly convenience.

Figure 3A:
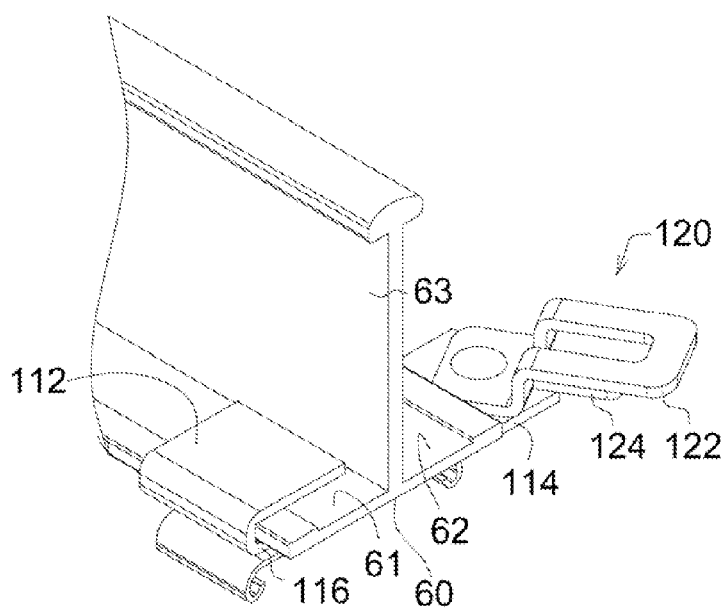
FIGS. 3A and 3B illustrate assembly procedures of a clipping jointer structure with a rigid body.
Figure 3B:
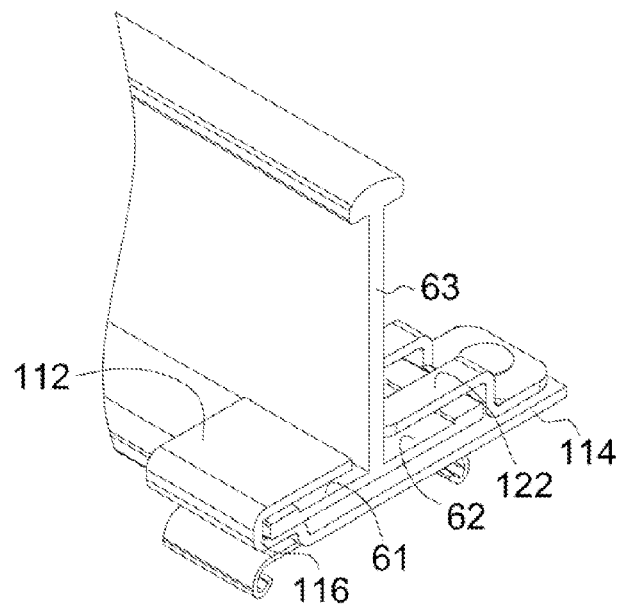

Detailed descriptions of the suspending portion 112 and the operating portion 122 are disclosed in FIGS. 3A and 3B. FIGS. 3A and 3B illustrate assembly procedures of a clipping jointer structure 100 with a rigid body 60. As indicated in FIG. 3A, a wing portion 61 of the rigid body 60 is tightly clamped by the suspending portion 112 and the bending portion 116 of the hooking member 110, such that the hooking member 110 buckles onto one side of the rigid body 60, and a wing portion 62 of the rigid body 60 is clamped by the first moving fastener 120. The first moving fastener 120 disposed on another side of the rigid body 60 can be horizontally rotated with respect to the hooking member 110. To release the buckling state, the user only needs to rotate the operating portion 122 of the first moving fastener 120 outwardly to separate the operating portion 122 from the side of the rigid body 60 as shown in FIG. 3A. Conversely, to enter the buckling state as indicated in FIG. 3B, the user only needs to rotate the operating portion 122 of the first moving fastener 120 inwardly, and another wing portion 62 of the rigid body 60 will be tightly clamped by the operating portion 122 and the extending portion 124, such that the first moving fastener 120 will buckle onto another side of the rigid body 60.

Figure 4A:
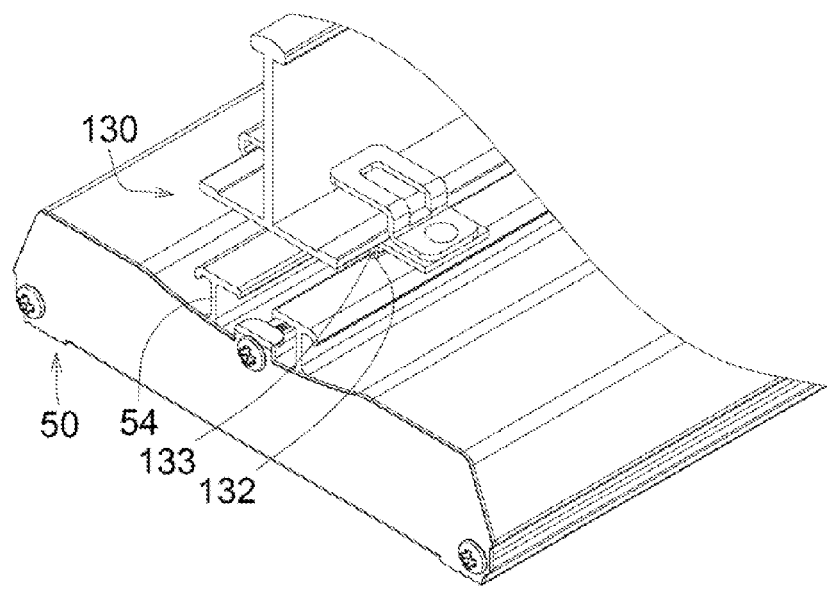
FIGS. 4A and 4B illustrate assembly procedures of a clipping jointer structure with a structure body.
Figure 4B:
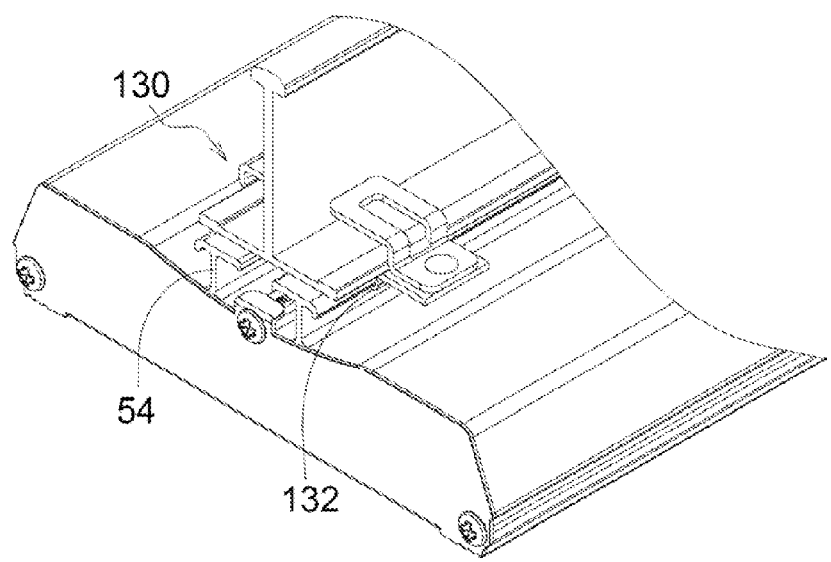

Detailed descriptions of the supporting portion 132 are disclosed in FIGS. 4A and 4B. FIGS. 4A and 4B illustrate assembly procedures of a clipping jointer structure 100 with a structure body 50. The bracket 54 of the structure body 50 is slid into the two C-shaped recesses 133 of the supporting portion 132 of the second moving fastener 130. As long as two C-shaped recesses 133 of the supporting portion 132 respectively buckle onto the bracket 54 of the structure body 50, the structure body 50 will be suspended on the rigid body 60 through the use of the clipping jointer structure 100 of the present embodiment.

Figure 5A:
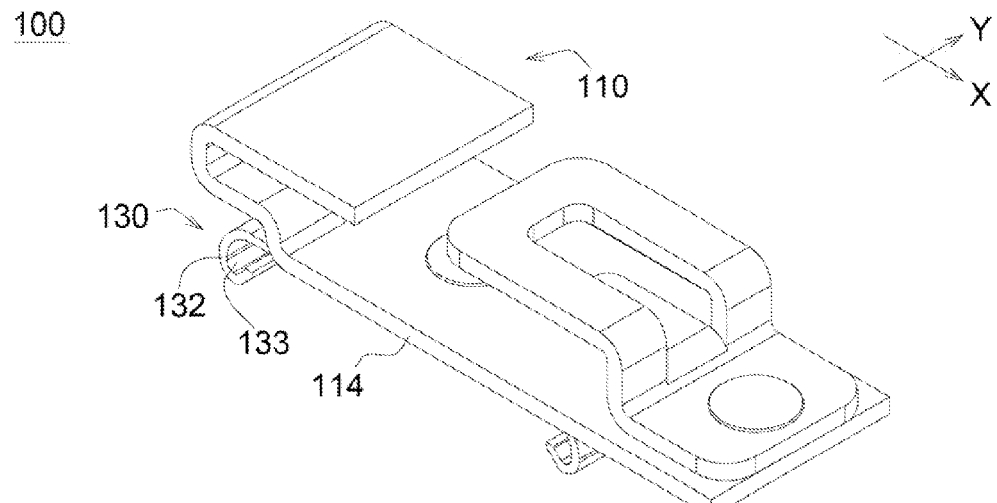
FIGS. 5A and 5B illustrate how a second moving fastener is rotated by 90 degrees.
Figure 5B:
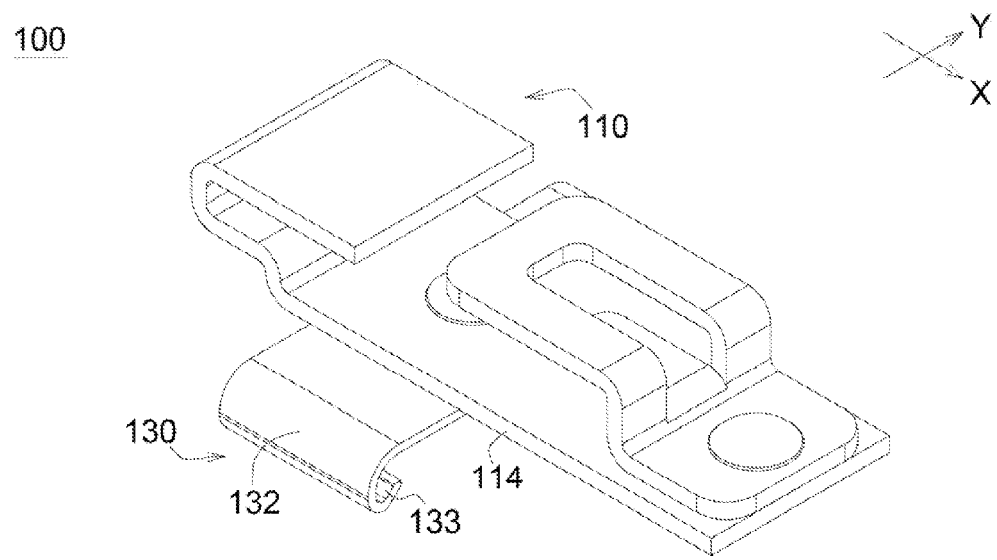

Referring to FIGS. 5A and 5B. The second moving fastener 130 disposed under the board 114 is also horizontally rotated with respect to the hooking member 110. The angle of the second moving fastener 130 is adjusted between X-axis direction and Y-axis direction as shown in FIGS. 5A and 5B. By rotating the second moving fastener 130, the supporting portion 132 disposed on two opposite sides of the second moving fastener 130 can be located between the X-axis direction and the Y-axis direction, such that the angle of the structure body 50 buckled on the supporting portion 132 of the second moving fastener 130 can be adjusted accordingly. Therefore, the clipping jointer structure 100 of the present embodiment can be rotated to an angle to match the installation environment and increase assembly variability.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A clipping jointer structure used for suspending a structure body on a rigid body, the clipping jointer structure comprising:
   a hooking member assembled to the rigid body and having a suspending portion to buckle the hooking member onto one side of the rigid body;
   a first moving fastener disposed on a board of the hooking member and having an operating portion to buckle the first moving fastener onto another side of the rigid body or separate the first moving fastener from the rigid body, wherein the operating portion and the suspending portion are opposite in parallel, and the operating portion and the suspending portion are separated from the board by a gap;
   a second moving fastener disposed on the board of the hooking member and having a supporting portion to buckle the second moving fastener onto the structure body; and
   a first coupling member fixing the first moving fastener onto the board, so as to allow the first moving fastener to rotate with respect to the board.

2. The clipping jointer structure according to claim 1, wherein the first moving fastener and the second moving fastener are respectively disposed on two opposite sides of the board.

3. The clipping jointer structure according to claim 1, wherein the first coupling member comprises a rivet.

4. The clipping jointer structure according to claim 1, wherein the second moving fastener comprises a second coupling member which is fixed onto the board so as to allow the second moving fastener to rotate with respect to the board.

5. The clipping jointer structure according to claim 4, wherein the second coupling member comprises a rivet.

6. The clipping jointer structure according to claim 1, wherein the first moving fastener comprises an extending portion extended in a direction parallel to the operating portion, and the extending portion and the operating portion are used for clamping a wing portion of the rigid body.

7. The clipping jointer structure according to claim 1, wherein the hooking member comprises a bending portion connecting the board and the suspending portion, and the bending portion and the suspending portion are used for clamping another wing portion of the rigid body.

8. The clipping jointer structure according to claim 1, wherein the supporting portion is bent inwardly from two opposite sides of the second moving fastener to form two C-shaped recesses.

9. A clipping jointer structure used for suspending a structure body on a rigid body, the clipping jointer structure comprising:
    a hooking member having a board and a suspending portion;
    a first fastener having an operating portion rotatably disposed on the board of the hooking member, wherein the clipping jointer structure is buckled onto the rigid body by buckling the suspending portion of the hooking member and the operating portion of the first fastener on the rigid body; and
    a second fastener disposed on the board of the hooking member and having a supporting portion for buckling the structure body,
    wherein the operating portion of the first fastener is rotatable to a first position to buckle the rigid body and to a second position to release the rigid body.

10. The clipping jointer structure according to claim 9, wherein the rigid body has a wing portion, and the clipping jointer structure is buckled onto the rigid body by buckling the suspending portion of the hooking member and the operating portion of the first fastener on the wing portion of the rigid body.

11. The clipping jointer structure according to claim 9, wherein the second fastener is rotatably disposed on the board of the hooking member.

12. The clipping jointer structure according to claim 9, wherein the operating portion of the first fastener and the supporting portion of the second fastener are respectively disposed on two opposite sides of the board of the hooking member.

* * * * *